Aug. 18, 1964  T. J. TUREK  3,145,032
LOAD CONTROLLED VALVE FOR VEHICLE AIR SPRINGS
Filed Oct. 28, 1957
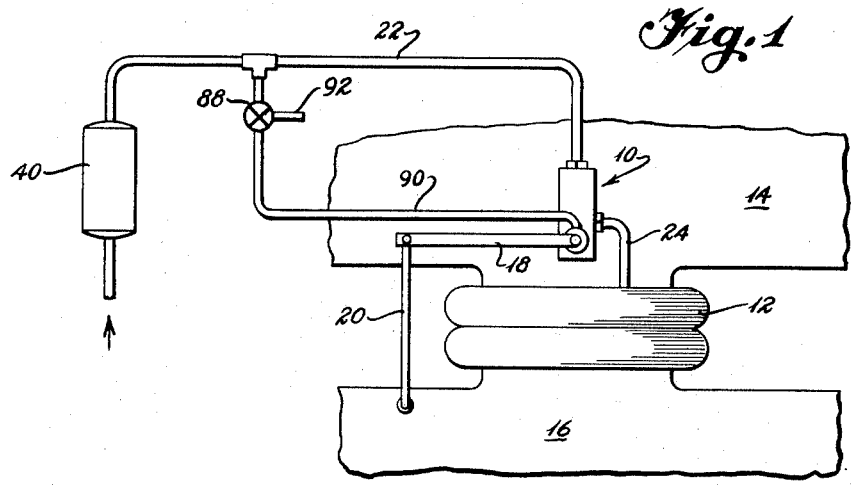
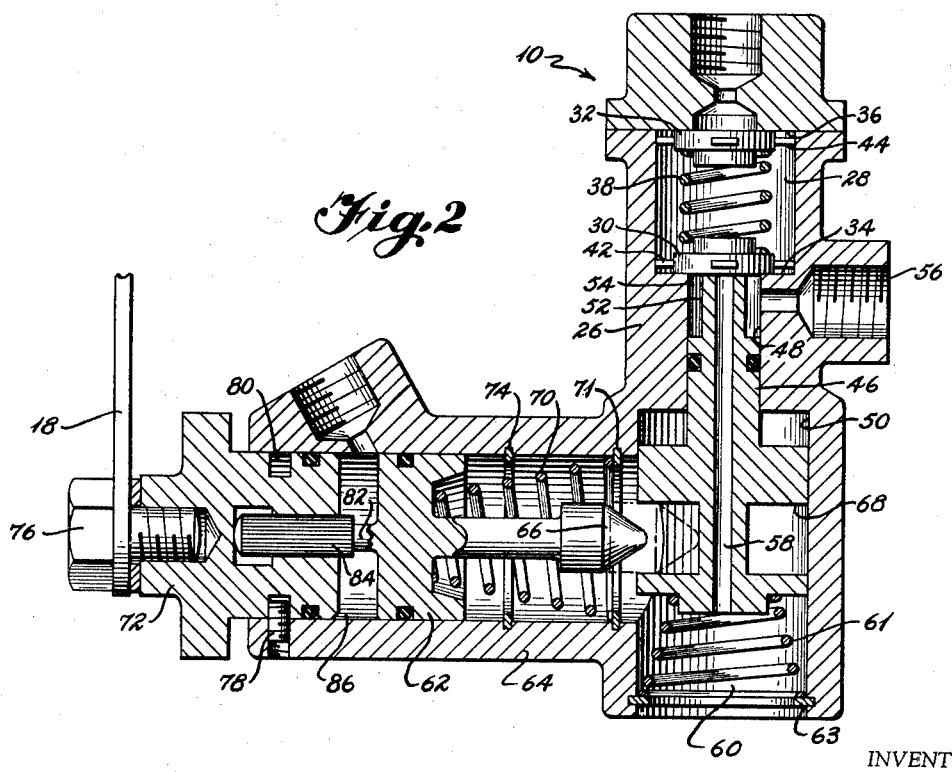
INVENTOR
Thomas J. Turek
BY Scrivener and Parker
ATTORNEYS United States Patent Office 3,145,032
Patented Aug. 18, 1964

3,145,032
LOAD CONTROLLED VALVE FOR VEHICLE
AIR SPRINGS
Thomas J. Turek, Elyria, Ohio, assignor to Bendix-Westinghouse Automotive Air Brake Company, Elyria, Ohio, a corporation of Delaware
Filed Oct. 28, 1957, Ser. No. 692,944
6 Claims. (Cl. 280—124)

This invention relates to motor vehicle air spring suspension systems and more particularly to an improved control valve mechanism for controlling the leveling action of the vehicle frame in response to changes in load conditions.

The usual air spring suspension system utilizes a compressor, reservoir, air bellows or cushions between the axles and vehicle frame and leveling valves for controlling the volume of the bellows in accordance with vehicle loading. The leveling valve is usually carried on the frame and incorporated in the system between the bellows and reservoir and is actuated to admit or exhaust pressure to or from the bellows in response to the positioning of a lever having one end operatively connected to the valve and the other end operatively connected to the axle. As the lever oscillates about a central or neutral position in accordance with vehicle loading it connects the bellows either to reservoir pressure or to atmosphere to raise or lower the vehicle frame with respect to the axle until the desired level is restored at which point further leveling action ceases. It will be apparent that as a vehicle proceeds along a road the lever will oscillate with great rapidity about its desired level or neutral position and since it is supposed that the vehicle before moving was properly leveled, further leveling action as by rapid exhaustion and replenishment of pressure to the bellows is unnecessary and sometimes undesirable and leveling action should be restricted to only such times as there is actually a change in vehicle loading.

The primary object of the present invention is to provide a novel leveling valve construction for vehicle air springs, which allows leveling action to take place at preselected times, such as for example, when the vehicle is stopped and is being loaded or unloaded.

Another object is to provide a novel leveling valve for vehicle air springs which is activated for leveling action by fluid pressure when the vehicle is stopped and changes in loading occur and which may be deactivated at the will of the operator so that no leveling action will take place during over-the-road operation of the vehicle.

Another object is to provide in a leveling valve construction of the above character, a novel arrangement whereby the operator may disconnect the leveling control arm or lever from the leveling valve so that the latter may be deactivated at the will of the operator. Such an arrangement avoids operation and consequent wear of the parts of the leveling valve which would otherwise occur during over-the-road operations of the vehicle, for example.

Still another object is to provide a novel arrangement of parts wherein vehicle leveling may be secured during changes in vehicle loading with the vehicle at rest and wherein the leveling valve may be quickly and efficiently rendered inoperative and inactive at the will of the operator.

A still further object is to provide a valve of the above character which when deactivated traps the existing pressure in the air springs.

Other objects and novel features of the invention will appear more fully hereafter from a consideration of the following description when taken in connection with the accompanying drawing illustrative of one form of the invention. It is to be expressly understood, however, that the drawing is utilized for purposes of illustration only, and is not to be taken as a definition of the limits of the invention, reference being had for this purpose to the appended claims.

In the drawing, wherein similar reference characters refer to similar parts throughout the several views:

FIG. 1 is a diagrammatic view of the leveling control valve mechanism of the invention associated with a vehicle air spring of conventional construction; and FIG. 2 is a side view in section of the leveling valve of FIG. 1.

Referring more particularly to FIG. 1, the novel control valve mechanism 10 of the present invention is illustrated therein in association with a conventional type of air spring or bellows 12, the valve mechanism being mounted on a portion 14 of the vehicle frame and the air spring being interposed between the frame portion 14 and an axle portion 16. The control valve 10 controls the flow of compressed air to and from the air spring 12 in accordance with variations in the distance between the frame portion and the axle portion 16, operation of the valve being effected by oscillation of a control arm 18, the outer end of which is connected with the axle portion 16 by means of a link 20. It will be understood that the valve mechanism 10 may be used to control air springs on opposite sides of the vehicle or separate control valve mechanisms may be utilized for each air spring, if desired.

As will appear more fully hereinafter, the control valve mechanism 10 functions to control the air pressure within the air spring 12 so that a predetermined distance will be maintained between the frame and axle portions 14 and 16 regardless of variations in loading of the vehicle. Thus, in the static condition of FIG. 1, and assuming a no-load condition of the vehicle, a predetermined air pressure is trapped within the air spring 12 so that the frame portion 14 is maintained a predetermined distance above the axle portion 16. In the event the vehicle load is increased, the portions 14 and 16 will approach each other and the outer end of arm 18 will move upwardly, relatively to the lapped or neutral position of the valve, to actuate the control valve mechanism 10 to supply additional air pressure to the air spring 12 by way of conduits 22 and 24 to finally return the frame part 14 to the position shown. On the other hand, as the vehicle load is decreased, the expansion of the air spring 12 will cause the frame portion 14 to move upwardly with respect to the axle portion 16 and the control arm 18 will move downwardly, relatively to the lapped position of the valve, to actuate the control valve mechanism to exhaust air from the bellows 12 to again allow the frame portion to return to the neutral position shown.

The novel leveling valve 10 of the present invention is more particularly shown in FIG. 2 and includes a casing 26 which is mounted on one of the relatively movable vehicle members, such as the vehicle frame. Valve 10 also includes an inlet chamber 28, a combined inlet and exhaust disk valve 30 and a check valve 32, the latter valves being maintained closed on their respective seats 34 and 36 as by means of a spring 38. Check valve 32 prevents return flow of compressed air to a compressed air reservoir 40 via conduit 22 while the disk valve 30 controls the flow of compressed air to and from the air spring 12 in accordance with variations in the vehicle loading as reflected by movement of the arm 18, as heretofore described. Valves 30 and 32 are provided with spaced guide members 42 and 44 respectively in order to permit air flow to and from the chamber 28. A suitable engine driven compressor, not shown, is utilized to charge the reservoir 40 and to maintain the air pressure therein within predetermined limits.

In order to control the disk valve 30 in accordance with variations in the vehicle loading, an exhaust valve stem 46 is slidably mounted within coaxial bores 48 and 50 in the casing 26, the upper portion of the stem being reduced at 52 to provide an outlet chamber 54 to connect the inlet chamber, with an outlet port 56 when the disk valve 30 is open and to provide an exhaust cavity for the port 56 when the valve 30 is closed and the stem 46 moves downwardly out of engagement with the valve 30. Port 56 is connected with the air spring 12 by conduit 24. As shown, the valve stem 46 is provided with a through exhaust bore 58 which communicates at all times with an exhaust chamber 60 open to the atmosphere. A spring 61 is interposed between the lower end of the stem 46 and a stationary ring 63, said spring being lighter than spring 38 but sufficiently heavy to normally maintain the upper end of the stem 46 in contact with the disk valve 30 against the maximum air pressure in the air spring 12.

A novel construction is provided for controlling the reciprocation of the valve stem 46 in accordance with variations in the loading of the vehicle. As shown, such construction includes a shaft 62 which is oscillatably mounted within a sleeve 64 of the casing 26 and which is formed with a valve actuating element 66 adapted to be moved into and out of an annular groove 68 formed in the valve stem 46. Normally the shaft 62 and element 66 are maintained in the full line position of FIG. 2 by a spring 70 which is confined between the shaft and a ring 71. Under these circumstances, the element 66 is withdrawn from the groove 68 so that oscillations of the shaft 62 due to displacements of the control arm 18 in a manner which will appear more fully hereinafter, will have no effect on the valve 10. However, when the shaft 62 is moved to the right in FIG. 2, to engage stop ring 74, the element 66 will enter the groove 68, as shown in dotted lines, whereupon oscillations of the shaft 62 will cause operation of the valve 10. It is pointed out that the valve actuating element 66 is eccentrically mounted on the shaft 62 and thus functions as a cam or eccentric in reciprocating the valve stem 46 when the element enters the groove 68.

In order to oscillate shaft 62 in accordance with displacements of the control arm 18, the latter is secured by a screw 76 to a shaft 72, the latter being oscillatable in the sleeve 64 but mounted against endwise movement therein as by means of a set screw 78 receivable in an annular groove 80. Shaft 62 is provided with an extension 82 which is splined at 84 to the shaft 72, this construction ensuring oscillation of shaft 62 with shaft 72 while permitting the valve activating element or cam 66 to be moved into and out of the groove 68.

One of the important features of the invention resides in the control of the valve actuating cam 66 so that the valve 10 may be rendered operative or inoperative at the will of the operator. In the form shown, the space 86 between the shafts 62 and 72 constitutes a cylinder which is adapted to be charged with compressed air to move the shaft 62 and integral element 66 to the right, as viewed in FIG. 2 so that said element will enter the groove 68. When this occurs, displacement of control arm 18 will, through connected shafts 72 and 62, reciprocate the valve stem 46 and control the inflation or deflation of the air springs in accordance with changes in the vehicle loading. A conventional three-way valve 88 connects the supply conduit 22 with the space 86 through a conduit 90, and such valve may be manually operated or mechanically or electrically responsive to a condition of the vehicle, as for example to the opening of the doors, to either connect the space 86 with the reservoir 40 or to disconnect the reservoir and connect the space 86 to atmosphere through an exhaust port 92 in the valve 88. It will be understood that when the space 86 is connected to atmosphere the spring 70 will return the shaft 62 and element 66 to the position shown in full lines whereupon valve 10 will be deactivated irrespective of movement of the control arm 18 and oscillations of the connected shafts 72 and 62. It is contemplated that valve 10 will be rendered operative when the vehicle is stationary so that proper leveling of the vehicle may be effected in accordance with variations in the vehicle loading, and will be rendered inoperative during over-the-road operations of the vehicle when the loading is not changed. However, the invention is not limited to such operation, as the valve 88 may be operator-controlled at any time, if desired. Operation of valve 88, however, does not disturb the air supply to the valve 10, which is connected at all times directly to the reservoir 40 by conduit 22 regardless of the position of valve 88.

From the foregoing, the operation of the novel control valve mechanism in efficiently controlling the leveling action of the vehicle with changes in load will be readily understood. Assuming that the air springs are charged with compressed air at the no load condition of the vehicle, when the valve 88 is operated to charge the chamber 86, the shaft 62 and valve actuating cam 66 will be moved to the right, as viewed in FIG. 2 so that the cam 66 will enter the groove 68 as shown in dotted lines. As the vehicle is loaded, the arm will be moved relatively upwardly, see FIG. 1, to open the disk valve 30 through operation of the connected shafts 72 and 62, cam 66 and upward movement of valve stem 46 to supply additional compressed air to the air springs until such time as the vehicle frame returns to its predetermined level or height distance above the axle. When this occurs, the disk valve 30 will close, due to the return of the parts 18 and 66 to the normal position.

It will be understood that with the cam 66 positioned within slot 68 and unloading of the vehicle occurs, the arm 18 will move relatively downwardly to withdraw the stem 46 from the disk valve 30. When this occurs, the air pressure within the air springs will be reduced by way of conduit 24, port 56, chamber 54, exhaust bore 58 and exhaust chamber 60. Here again, however, the parts will be restored to the normal positions with the vehicle frame returned to its proper level, and regardless of the new loading of the vehicle.

It will be further understood that the cam 66 is provided with a pointed end to facilitate entry of the cam into the groove 68 to properly position the valve stem 46 with respect to the lever 18 should the cam 66 be displaced relative to the direct engaging position of the groove 68 as shown in FIG. 2.

During over-the-road operation of the vehicle, the arm 18 will be rapidly operated in accordance with road conditions and at this time, it is desirable that the valve 10 be deactivated to avoid wear of the valve parts and to trap the compressed air within the air springs. This type of operation is readily effected by the invention as the valve 88 is moved to connect the chamber 86 with the exhaust port 92. When this occurs, spring 70 moves the valve actuating cam 66 out of the groove 68 as seen in full lines in FIG. 2. Movements of the arm 18 will then not be transmitted to the valve 10 and the latter will trap the compressed air within the air springs since valve 30 will be closed and the valve stem 46 will be maintained in contact with the valve 30 by action of the spring 61.

From the foregoing, it will be seen that the present invention provides a novel control valve mechanism for efficiently controlling the leveling action of a vehicle equipped with air springs. The arrangement of the rotatable and slidable shaft 62 and the cam 66 controlled thereby enables the leveling valve to be deactivated by the operator or to be readily placed in operative condition for vehicle leveling in accordance with load changes. In effect, the cam 66 and groove 68 constitute a clutch for rendering the leveling valve operative or inoperative and this clutch is fluid operated through the admission of compressed air to the cylinder 86. When this occurs, the shaft 62 functions as a piston, and in order to prevent leakage of air from the cylinder, suitable O-ring seals are provided for shafts 72 and 62 as shown. When the leveling valve is deactivated, it will be clear that wear of the valve parts is eliminated, thus materially increasing the efficiency and life of the valve.

While a preferred form of the invention has been described herein with considerable particularity, it will be understood by those skilled in the art that various modifications may be made therein without departing from the spirit of the invention. Reference will therefore be had to the appended claims for a definition of the limits of the invention.

What is claimed is:

1. Control means for regulating the air pressure within a vehicle air spring for maintaining the vehicle frame a predetermined distance above the vehicle axle, comprising a leveling valve having a casing adapted to be mounted on the frame, and having an inlet adapted to be supplied with compressed air, valve means within the casing for controlling the flow of compressed air to and from the air spring, a single valve actuating element within the casing for operating said valve means, said element being movable in opposite directions and being provided with a recess, means including an oscillatable lever responsive to relative movement between the frame and axle, means including a member movable in one direction into said recess and movable in the opposite direction out of said recess to positively connect and to positively disconnect said lever and element, a fluid pressure device for controlling the movements of said member in said directions, and manually operable means for applying compressed air to said device.

2. Control means for regulating the air pressure within a vehicle air spring for maintaining the vehicle frame a predetermined distance above the vehicle axis, comprising a leveling valve having a casing adapted to be mounted on the frame, and having an inlet adapted to be supplied with compressed air, valve means within the casing for controlling the flow of compressed air to and from the air spring, said valve means having a valve actuating element provided with an annular groove, means including an oscillatable lever responsive to relative movement between the frame and axle, and operator-controlled means including a member connected to all times with said lever and having a part movable into and out of said groove.

3. Control means for regulating the air pressure within a vehicle air spring for maintaining the vehicle frame a predetermined distance above the vehicle axle, comprising a leveling valve having a casing adapted to be mounted on the frame, and having an inlet adapted to be supplied with compressed air, valve means within the casing for controlling the flow of compressed air to and from the air spring, said valve means having a valve actuating element provided with an annular groove, means including an oscillatable lever responsive to relative movement between the frame and axle, a fluid pressure device having an oscillatable piston connected at all times with said lever, a cam eccentrically connected with said piston and movable into and out of said groove, and operator controlled means for controlling the flow of compressed air to and from said device.

4. Control means for regulating the air pressure within a vehicle air spring for maintaining the vehicle frame a predetermined distance above the vehicle axle, comprising a leveling valve having a casing adapted to be mounted on the frame, and having an inlet adapted to be supplied with compressed air, valve means within the casing for controlling the flow of compressed air to and from the air spring, said valve means having a valve actuating element provided with an annular groove, means including an oscillatable lever responsive to relative movement between the frame and axle, a fluid pressure device having a cylinder provided with a piston movable therein in opposite directions, means connecting said piston at all times with said lever so that oscillations of said lever will cause oscillations of said piston in said cylinder, a cam eccentrically carried by said piston, resilient means for moving said piston to a position where said cam is disengaged from said annular groove, and means for supplying compressed air to said cylinder to move the piston and cam to a position where the cam is engaged in said groove.

5. Control means for regulating the air pressure within a vehicle air spring for maintaining the vehicle frame a predetermined distance above the vehicle axle, comprising a leveling valve having a casing adapted to be mounted on the frame, and having an inlet adapted to be supplied with compressed air, valve means within the casing for controlling the flow of compressed air to and from the air spring, said valve means having a valve actuating element provided with a recess, an oscillatable lever responsive to relative movement between the frame and axle, and means for positively connecting said lever to and for positively disconnecting said lever from the valve actuating element comprising a fluid actuated clutch, said clutch including an oscillatable and reciprocable piston having a cam movable into and out of said recess during reciprocation of the piston.

6. Control means for regulating the fluid pressure within a vehicle fluid pressure spring for maintaining the vehicle frame a predetermined distance above the vehicle axle, comprising a leveling valve having a casing adapted to be mounted on the frame, and having an inlet connectible to a source of fluid pressure, intake and exhaust valve means within the casing for controlling the flow of pressure fluid to and from the fluid pressure spring, a single valve actuating member within the casing for operating said valve means, said member being movable in opposite directions to actuate said valve means, means including an oscillatable lever responsive to relative movement between the frame and axle, means including a connecting member movable in opposite directions to positively connect and to positively disconnect said lever and valve actuating member, there being a recess on one of said members and recess entering structure on the other of said members, a fluid pressure device for controlling movement of said connecting member in said opposite directions, and conduit means for connecting said fluid pressure device to said source of fluid pressure.

References Cited in the file of this patent

UNITED STATES PATENTS

| | | |
|---|---|---|
| 230,963 | Robertson | Aug. 10, 1880 |
| 1,585,833 | Down | May 25, 1926 |
| 1,816,075 | Down | July 28, 1931 |
| 2,820,647 | Jackson | Jan. 21, 1958 |
| 2,829,538 | Mueller | Apr. 8, 1958 |
| 2,910,305 | Marette | Oct. 27, 1959 |